United States Patent [19]

Raymer et al.

[11] Patent Number: 5,450,345
[45] Date of Patent: Sep. 12, 1995

[54] TERRAIN REFERENCED NAVIGATION-SCHULER CYCLE ERROR REDUCTION METHOD AND APPARATUS

[75] Inventors: Kris A. Raymer; John T. McGuffin, both of Albuquerque, N. Mex.

[73] Assignee: Honeywell Inc., Minneapolis, Minn.

[21] Appl. No.: 898,260

[22] Filed: Jun. 15, 1992

[51] Int. Cl.$^6$ ............................................. G06F 165/00
[52] U.S. Cl. ................................... 364/453; 364/443; 364/578; 364/572
[58] Field of Search ........... 364/487, 578, 572, 571.01, 364/581, 453; 324/76.77; 342/64; 73/178 R; 244/175

[56] References Cited

U.S. PATENT DOCUMENTS

| | | | |
|---|---|---|---|
| 4,144,571 | 3/1979 | Webber | 364/450 |
| 4,173,784 | 11/1979 | Heath et al. | 364/453 |
| 4,829,304 | 5/1989 | Baird | 342/63 |
| 4,837,696 | 6/1989 | Lebrun et al. | 364/427 |
| 5,008,825 | 4/1991 | Nadkarni et al. | 364/434 |
| 5,247,748 | 9/1993 | Hojo et al. | 33/326 |

OTHER PUBLICATIONS

Boozer et al; The AFTI/F16 Terrain-Aided Navigation System; IEEE National Aerospace and Electronics Conference; May 20–24, 1985; pp. 351–357.

Primary Examiner—Michael Zanelli
Attorney, Agent, or Firm—Craig J. Lervick; Ronald E. Champion

[57] ABSTRACT

A method for Schuler cycle error reduction is provided for use in a terrain referenced navigation system. Terrain Reference Navigation filter coefficients are analytically determined using a terrain reference navigation database and a hypothetical Schuler cycle. The optimum filter coefficients are determined assuming that there will be three parallel filters being executed during flight. The first filter is a nominal filter which represents a compromise between sensing zero crossing of a Schuler cycle error and peak changes of a Schuler cycle. The other filters are chosen to be perpendicular to the instantaneous line of flight. One is a peak filter, the other is a zero crossing filter. The peak filter is set to capture the inertial navigation unit when the Schuler cycle is changing rapidly. The zero crossing detector is set to capture the inertial navigation unit when it is zero crossing. The Schuler cycle is detected by algebraically noting similar features of each filter. INS measurements are then dynamically compensated for the now known Schuler cycle.

22 Claims, 4 Drawing Sheets

TERRAIN REFERENCED NAVIGATION-SCHULER CYCLE ERROR REDUCTION METHOD AND APPARATUS

This invention relates to a method of increasing the accuracy of a terrain referenced navigation system by reducing the Schuler cycle error and, more particularly, to a method of compensating for the Schuler cycle error by analytically determining the coefficients of three parallel filters and dynamically adjusting the inertial navigation estimates.

BACKGROUND OF TERRAIN REFERENCED NAVIGATION

One prior art terrain aided navigation system is available from Sandia Labs. Sandia has created the Sandia Inertial Terrain-Aided Navigation (SITAN) flight-computer algorithm that produces a very accurate trajectory for low-flying, high-performance aircraft by combining outputs from a radar or laser altimeter, an inertial navigation system (INS), and a digital terrain elevation map. SITAN is a recursive, real time, terrain-aided navigation algorithm for use on fighter aircraft. The algorithm has been implemented in a popular microprocessor. The aircraft's position can be estimated within a 926 meter circle error of probability. A good description of the SITAN terrain aided navigation system can be found in the proceedings of the IEEE National Aerospace and Electronics Conference—NAECON, May 20–24, 1985 entitled *The AFTI/F16 Terrain-Aided Navigation System*, by D. D. Boozer, M. K. Lau, J. R. Fellerhoff, Sandia National Laboratories, Albuquerque, N. Mex. 87185.

SITAN utilizes Kalman filter algorithms to process geophysical measurements. The algorithm estimates errors in a flight path produced by an inertial navigation system following the equations given in the above-mentioned article quoted below.

"The Kalman filter can be formed with the following state model and measurement:

$$\underline{\delta X_{k+1}} = \Phi \underline{\delta X_k} + \underline{W_k}$$

$$C_k = C(\underline{X_k}) + V_k$$
$$= Z_k - h(.,.) + V_k$$

where:
$\underline{\delta X_k}$ = INS error states to be estimated
$\Phi$ = state-transition matrix for INS errors
$\underline{X_k}$ = states of INS and aircraft
$C_k$ = ground clearance measurement
$Z_k$ = altitude of aircraft
h = height of terrain at position (.,.)
$\underline{W_k}$ = driving noise with $E(\underline{W_k}) = \underline{0}$ for all k and $E(\underline{W_k}\underline{W_j}^T) = Q_k\delta_{kj}$
$V_k$ = measurement error with $E(V_k) = 0$ for all k and $E(\underline{V_k}\underline{V_j}) = R_k\delta_{kj}$
k = subscript denoting time k.

Since the measurement function $c(\underline{X})$ is a nonlinear function of the states, the standard extended Kalman filter approach is used to obtain the measurement matrix, $$H_k = \frac{\partial c(\underline{X})}{\partial \underline{X}} \bigg|_{\underline{X} = \underline{X_k}(-)} = [-h_x, -h_y, 1, 0, 0 \ldots]$$

where $h_x$ and $h_y$ are the terrain slopes in the x and y directions of the map evaluated at $\underline{X_k}(-)$, the predicted aircraft position just before a measurement is processed at time k. The first three states are taken to be the x position, y position, and altitude, respectively. At any time k, $$\underline{X} = \underline{X}_{INS} + \underline{\delta X}$$

The state vector often used in a single filter implementation is $$\underline{\delta X} = [\delta X \ \delta Y \ \delta Z \ \delta V_X \ \delta V_Y]^T$$

where $\delta X$, $\delta Y$, $\delta Z$, $\delta V_X$, and $\delta V_Y$ are errors in the X position, Y position, altitude, X velocity, and Y velocity, respectively. Other INS errors and states can also be included in $\underline{\delta X}$ by using the proper $\Phi$.

Parallel SITAN was developed because the distance needed by SITAN to reach steady state becomes excessive as initial position errors (IPEs) approach several hundred meters. Parallel SITAN is a bank of extended Kalman filters that process identical altimeter measurements. After some updates, the filter with the minimum average weighted residual squared (AWRS) value is identified as having the correct position estimate. The AWRS value is defined by $$AWRS_{jth\ filter} = \frac{1}{n} \left[ \sum_{i=1}^{n} \frac{\Delta_i^2}{H_i P_i H_i^T + R_i} \right]_{jth\ filter}$$

where $\Delta_i$ is the residual at the ith update, n is the number of updates, and $HPH^T+R$ is the residual variance. Once the IPEs are reduced by the parallel filters, a single filter performs well, starting off essentially in steady state.

To implement parallel SITAN, the number and geometrical layout of the parallel filters needed to cover an IPE must be specified. A square, constant-spaced grid can be used to center the filters about the horizontal position indicated by the INS. Filters at and near the corners are then eliminated to reduce the number of filters. To further lighten the computational burden, three-state, instead of five-state, filters are often used in parallel SITAN with $$\underline{\delta X} = [\delta X \ \delta Y \ \delta Z]^T$$

For both the single and parallel filter implementation,s least-squares plane fit to the map, known as stochastic linearization, is used to compute the slopes, $h_X$ and $H_Y$. Horizontal uncertainties $\sigma_X$ and $\sigma_Y$ from the error-covariance matrix, defined by $$P = E[(\underline{\delta X} - \underline{\hat{\delta X}})(\underline{\delta X} - \underline{\hat{\delta X}})^T]$$

and $$Diag\ P = [\sigma_X^2\ \sigma_Y^2\ \sigma_Z^2\ \sigma_{V_X}^2\ \sigma_{V_Y}^2]$$

are used to determine the size of the plane. Residuals from the plane fit, $RFIT_k$, are added to the measurement error variance, $R_k$, to ensure that the SITAN filter assigns less weight to the measurement when the plane fit is either very large or is over a rough area, thus adapting to local terrain."

SITAN has three basic modes: acquisition mode, lost mode and track mode.

ACQUISITION MODE

The information from the inertial navigation position is used. When one of the 57 filters identifies a reliable estimate of true aircraft position, the track mode is entered. A single five state Kalman filter is initialized at the estimated acquired position. During track mode, the aircraft's position is estimated every 100 meters. SITAN employs a mode control logic concept to handle the transition from track to lost and from acquisition to track.

Acquisition mode is used to locate the aircraft's position within a circular region of uncertainty. The region of uncertainty is called the circular error of probability or CEP. In SITAN a 2100 meter initial position CEP is covered with 57 3-state Kalman filters centered on a grid whose initial positions are 525 meters apart.

The state acquisition filters include error states. They can estimate an aircraft's position under significant INS velocity errors. Each filter is initialized with position error estimates. To ensure that erroneous information is not employed to update the filters, none of the filters are updated if the pitch altitude is greater than 30 degrees or if the altimeter loses lock or the INS fails.

If the mode control logic of SITAN indicates that the aircraft has deviated from the 2363 meter search area, the lost mode is initiated. The lost mode ceases to provide position estimates for the aircraft, and the pilot has to update the inertial navigation system before restarting SITAN.

TRACK MODE

Track mode estimates the position of the aircraft during flight. The five state tracking filter is used. The acquisition mode initializes the track filters. The track mode makes estimates of terrain slopes in rectangles surrounding the center of the aircraft position. The track filters are not updated during track mode unless the inertial navigation system, altimeter, and other flight data are valid.

Track mode is entered when the aircraft's actual position is close to the estimated one. In the event of a false fix, the track filter is set at the wrong position and the SITAN algorithm will proceed as if it was correct. This produces large errors in estimated positions. It is imperative that the probability of a false fix be kept low. The following is taken from the above-mentioned article in regard to the mode control logic of SITAN.

With the design for the acquisition, lost, and track modes as described above, the mode-control logic . . . . . . is needed to determine in which mode the algorithm should operate. When large aircraft position errors exist, it should choose the acquisition mode; with small errors, the track. The main parameter used in the mode-control logic for transition from acquisition to track is the AWRS . . . . . . In the acquisition mode the parallel filters will tend to migrate to the relative minima of this surface.

To keep the parallel filters from migrating too far from their initial positions, a maximum of 128 updates is allowed. Four tests are performed after every 32 updates to determine if transition to the track mode is possible by selecting the acquisition filter with the minimum AWRS. Test 1 requires the selected filter to have an AWRS lower than a threshold value to ensure that the parallel filters are indeed over the correct aircraft position. If the parallel filters are configured over an area which does not include the true aircraft position, the global minimum of the AWRS curve is expected to shift upward. Test 2 requires contrast in the terrain, a sufficient difference between $AWRS_{min}$ and $AWRS_{max}$ to prevent transition to the track mode over very smooth areas such as water. Test 3, the false-fix test, requires that the minimum AWRS outside of an exclusion region, $AWRS_{min}$ does not compete with $AWRS_{min}$, where the size of the exclusive region is computed using $\sigma_X$ and $\sigma_Y$ of the selected filter. Statistically, as more updates are made, the separation between the global minimum and relative minima can be realized and still retain the same confidence level. Therefore, the required separation between $AWRS^*_{min}$ and $AWRS_{min}$ should be a function of $1/n$, where n is the number of updates. Test 4 requires the $\sigma_X$ and $\sigma_Y$ of the selected filter to be smaller than its initial value, 200 m, indicating that improvements have been made in estimating the aircraft's position during acquisition.

If track is not entered after 128 updates, a test for the lost mode is made. If $AWRS_{min}$ is greater than a threshold, the lost mode is entered and AFTI/SITAN will not produce any more estimates until the pilot updates the INS, which will automatically restart AFTI/SITAN in the track mode. If the lost condition is not met, the parallel filters are reset and acquisition starts over. This process continues until track or lost mode is entered.

Once in track, the track filter's $\sigma_X$ and $\sigma_Y$ are checked continuously while its AWRS is checked every 64 updates. If either the $\sigma$'s or the AWRS is too high, AFTI/SITAN switches back to the acquisition mode. The test on $\sigma$ prevents the track filter from using excessively large plane fits to maintain track after flying over smooth terrain for a long time. The AWRS test checks for unbelievable filter residuals.

BACKGROUND OF THE INVENTION

Prior art methods of terrain referenced navigation have suffered from inaccuracies due to Schuler cycle error. The Schuler cycle is one measure of the cyclic changes of the gravitational field of the earth. Schuler cycle error measurably effects inertia sensor based navigation systems, such as mechanical gyroscope based inertial navigation systems. On earth, the Schuler cycle varies periodically every 84 minutes. At two points in the Schuler cycle there is no Schuler cycle induced error.

Since the period of the Schuler cycle is known an inertial navigation unit could theoretically compensate for it if any one of its zero crossing points were known in time, or if any other point of the Schuler cycle was known in time.

A 24 hour linear bias is also being experienced by the inertial navigation system. The 24 hour bias is related to the earth's rotation about its axis. The 24 hour bias is measuring the rotation of the earth about its axis as it varies in the gravitational field of the sun and other planets.

Therefore it is the motivation of the invention to provide an apparatus and method that locates the Schuler cycle in time to increase the positional accuracy of an inertial navigation system.

SUMMARY OF THE INVENTION

The invention provides a Schuler cycle error reduction for a terrain reference navigation system. In the terrain reference navigation filter the coefficients are analytically determined using a terrain referenced data base with a hypothetical Schuler cycle imposed on the data base. Optimum filter coefficients are determined assuming three parallel filters executed during the hypothetical flight. The first filter is a nominal filter representing a compromise between sensing the zero crossing of a Schuler cycle and the peak changes of a Schuler cycle. The second filter is a peak filter which is chosen to be perpendicular to the instantaneous line of flight. The third filter is a zero crossing filter which is also chosen to be perpendicular to the instantaneous line of flight. The filter is set to capture the peak or the peak filter is set to capture the inertial navigation unit when the Schuler cycle is changing rapidly. The zero crossing detecting filter is set to capture inertial navigation unit when it is in zero crossing. The Schuler cycle is detected by algebraically noting similar features of each filter. Inertial navigation measurements can be dynamically compensated for the now known Schuler cycle.

BRIEF DESCRIPTION OF THE DRAWINGS

Other objects, features and advantages of the present invention will become apparent to those skilled in the art through the description of the preferred embodiment, claims and drawings herein where like numerals refer to like elements.

DESCRIPTION OF THE PREFERRED EMBODIMENT

In the Kalman filter used for terrain reference navigation a vector Q is defined. The Q vector contains an inertial system error model. The model includes estimates for error changes in North and East position, North and East velocity, and altitude as a function of time. Other time varying components may be modeled in the Q vector to increase a Kalman filter's accuracy. The invention provides a continuous model employing three filters which avoids complicating the Q vector further and does not severely impact a processor's throughput since the computational requirements are a function of the square of the states modeled by Q. The invention varies Q to more easily and accurately track variations in the Schuler cycle.

Figure 1A:
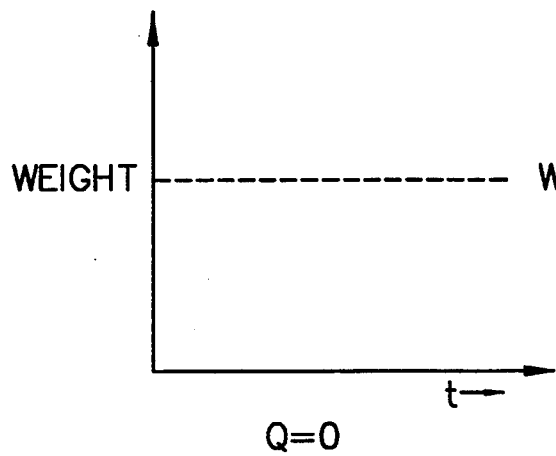
FIG. 1A shows a diagram of the effect of Q on the weighting of the terrain reference navigation system.
Figure 1D:
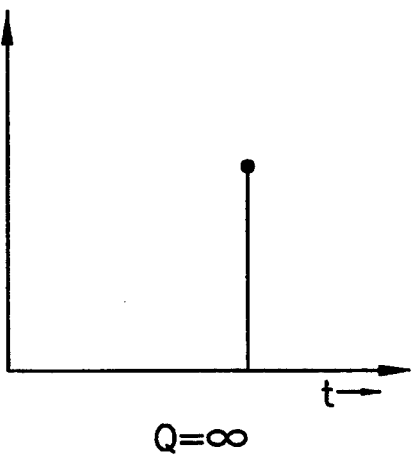
FIG. 1D shows the effect of a hypothetically large or infinite Q on the terrain reference navigation system.
Figure 1B:
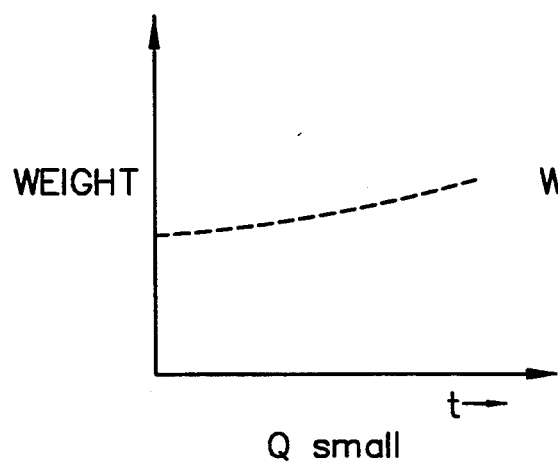
FIG. 1B shows the effect of a small Q on the INS system.
Figure 1C:
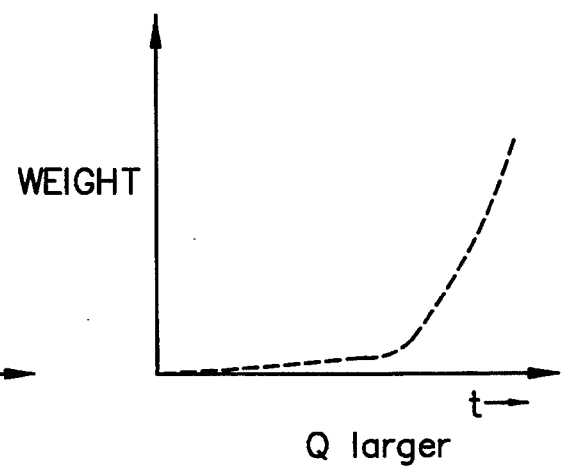
FIG. 1C shows the effect of a larger Q on the weighting of the terrain reference navigation system.

Now referring to FIGS. 1A through 1D which show the effect of the value of Q on sample weighting. FIG. 1A shows the case where Q equals zero. In this case all samples are equally weighted. FIG. 1B shows the case where Q is small. In this case newer samples have slightly greater weight. FIG. 1C shows the case where Q is large. In this case new samples have the most effect on the solution. FIG. 1D shows the case where Q equals infinity. In this case only the present sample is used in the solution. Q is related to the ability of the TRN system to remember the past. As Q approaches zero, virtually equal weight is given for all past samples. As Q increases, most of the weight is given to the most recent samples.

A long memory models the steady state well but does not model inflection points or peaks in the INS Schuler cycle very well. The shorter memory tends to give updates which are rougher and do not model the steady state as well but do track the peaks very well.

Figure 2A:
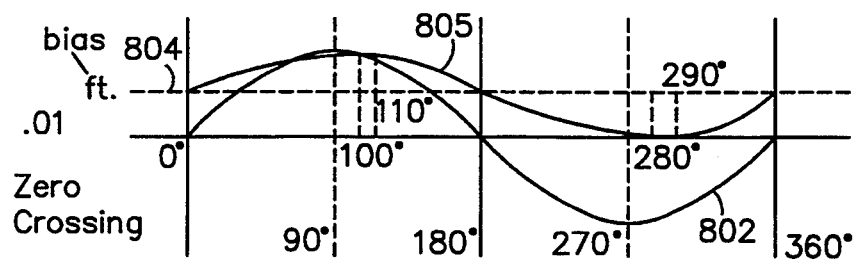
FIG. 2A shows a plot of the zero crossing detector against a hypothetical Schuler cycle.
Figure 2B:
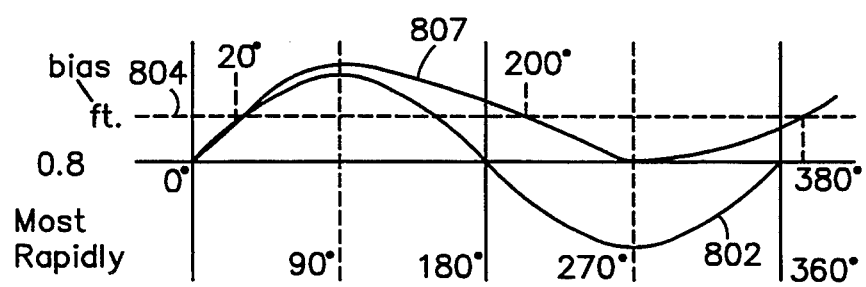
FIG. 2B shows a hypothetical graph of the most rapidly changing filter imposed on a graph of the hypothetical Schuler cycle.
Figure 2C:
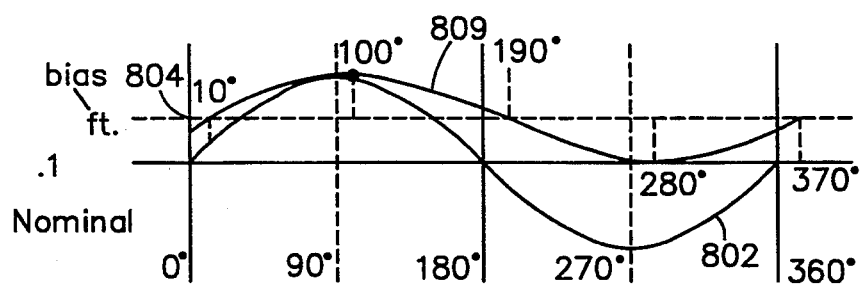
FIG. 2C shows a hypothetical graph of the Schuler cycle with a nominal Q filter of 0.1.

Now referring to FIGS. 2A, 2B and 2C which show the Schuler cycle bias and the 24 hour bias. FIG. 2A shows the zero crossing curve 805. FIG. 2B shows the most rapidly changing curve 807 and FIG. 2C shows the nominal bias curve 809. The Schuler cycle is illustrated as curve 802 in each diagram.

Now referring particularly to FIG. 2A which shows the zero crossing curve. The zero crossing error term is plotted as a function of time over the Schuler cycle. The 24 hour bias is indicated by line 804. In FIG. 2A the zero crossing points are located at 0°, 180°, and 360°. The zero crossing curve 805 is at a peak maximum at 110° and at a peak minimum at 280°. The zero crossing curve 805 indicates a zero crossing of the Schuler cycle 802 when it experiences a zero crossing. The Q vector modeled in the invention has states for North and East position error models, an altitude error model, and a model for the North and East velocity errors each as a function of time. The discussion to follow specifically discusses the error model in North velocity to illustrate the invention. Values given for Q are specific to this vector state location but those skilled in the art will appreciate that the concept of the invention can be expanded in a general sense. This curve has a Q of 0.2.

Now referring to FIG. 2B which shows the most rapidly changing curve 807. The zero crossings of the most rapidly changing curve 807 are at 20°, 200° and 380°. The positive peak is at 90° and the negative peak is at 270°. The rapidly changing curve 807 indicates a peak minimum or peak maximum of the Schuler cycle 802 when the rapidly changing curve 807 experiences a peak minimum or a peak maximum. This curve has a Q of 0.8.

Now referring to FIG. 2C which shows the nominal bias curve 809. FIG. 2C shows the nominal filter coefficient of 0.4 always 10° lagging the Schuler cycle 802. The nominal bias curve 809 tries to strike a balance between sensing zero crossing and rapid changes in the Schuler cycle.

The Schuler cycle 802 can be determined by looking at both curve 805 and curve 809 and noting when they have a zero crossing or have the same relative value. When they satisfy these conditions the Schuler cycle is in a predetermined position, in the example of FIGS. 2A-2C, the 280° position and the 100° respectively.

The method of the invention finds the location of the Schuler cycle 802, which is a sinusoid in time, by noting that at the 280° point the Schuler cycle 802 is close to its negative peak and at the 100° point the Schuler cycle 802 is close to its positive peak. The 100° point and 280° point are referenced from the beginning of the Schuler cycle defined as 0°.

The ability to accurately estimate the Schuler cycle phase allows an implementation of the INU error model which can be time-varying. The system error model, Q, can be set according to the estimated phase. When the error model is in a region of high change, Q can be set to provide a short memory. Likewise, during periods of small change, Q can allow a longer memory. This technique increases the system model accuracy without requiring dramatic increases in the necessary processor throughput. The 24 hour error bias 804 shown in FIG. 2A, 2B and 2C is incorporated in the total error due to inertial effects.

Figure 3:
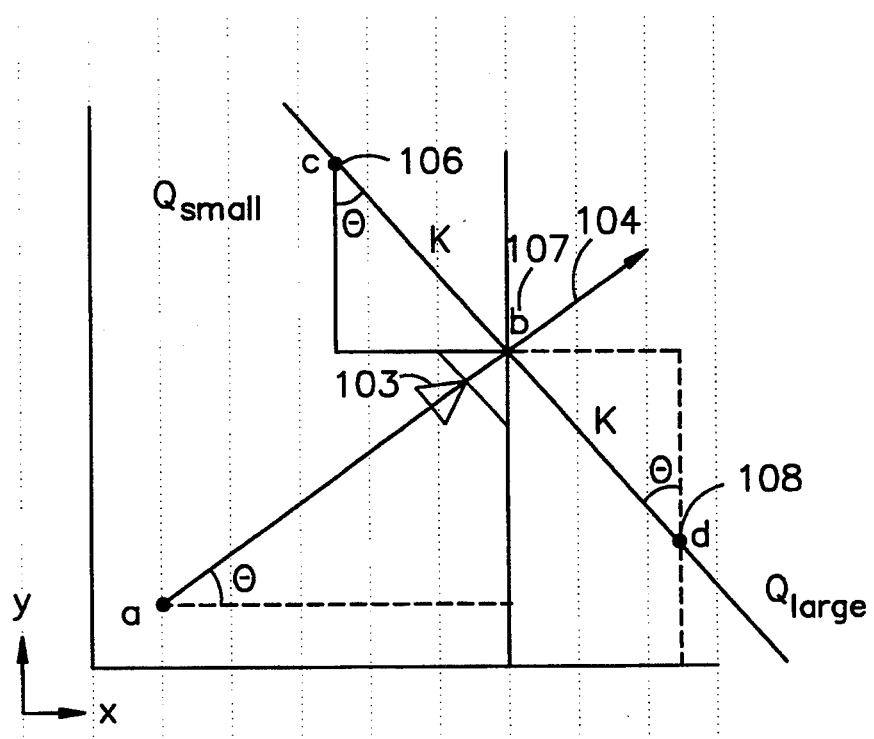
FIG. 3 shows a plot of the instantaneous line of flight of an aircraft with three filters in accordance with one aspect of the invention.

Now referring to FIG. 3 which shows an aircraft 103 flying in the direction of arrow 104. The aircraft 103 is heading from point A to point B along direction of arrow 104. Terrain Reference Navigation data is being obtained at point B 107 which corresponds to a Q filter of 0.4. The aircraft 103 is also performing a TRN calculation at point D with a large Q. In one embodiment of the invention the large Q is 0.8. The aircraft is also calculating a TRN point C 106 with a Q of 0.2, in one embodiment of the invention. The spacing between point C and B and point D and B in one embodiment of the invention is determined to be 150 meters.

In the example of FIG. 3 there are three (3) terrain reference navigation points. Each point has an associated filter. The center filter C, with Q equal to 0.4 represents the nominal filter in the actual aircraft position. The Q equal 0.4 filter is the normal error model for the Terrain Reference Navigation System. It represents a compromise in the filter's ability to capture steady state and swift changes in the Schuler cycle error. Side points C and D are chosen perpendicular to the instantaneous line of flight. Each filter is set to capture different aspects of the Schuler cycle as previously discussed. The peak filter is set to capture information accurately when the INU is rapidly changing. The zero crossing filter is set to capture the INU when it is crossing a zero point of the Schuler cycle. The zero crossing position of the Schuler cycle filter Q of 0.2 is also perpendicular to the line of flight. The zero crossing filter is set to optimally estimate the Schuler cycle near the zero crossing of the Schuler cycle.

Figure 4:
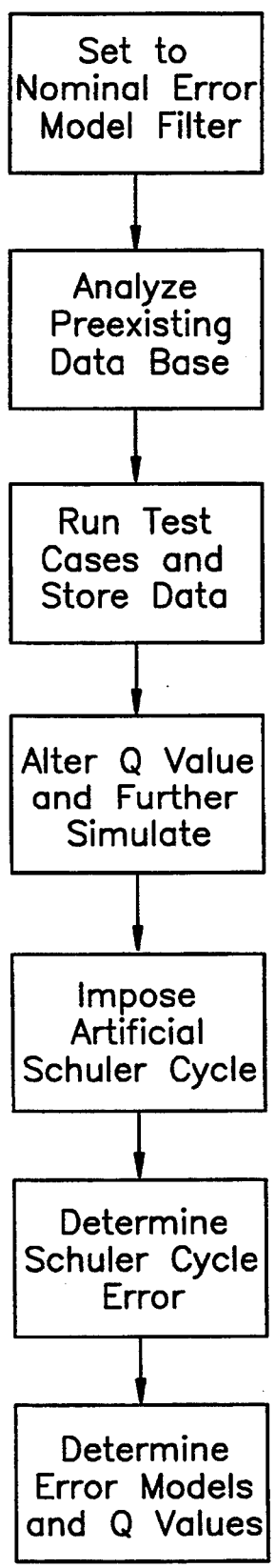
FIG. 4 shows a flowchart illustrating the process of determining the cyclic function for use as a predetermined error model by the terrain reference navigation system.

The invention employs an analytical technique for determining the value of Q for each filter. The process of determining the filter coefficients for each filter starts with the nominal error model filter. A simulation is done using Terrain Reference Navigation data from a simulated TRN flight. Hundreds of test cases are run on the flight path of a hypothetical aircraft running through a Terrain Reference Navigation database. Profiles are constructed for all of the hundreds of cases. The method of running such simulations are well known. Now, for the first time, in accordance with the method of the invention different Q's are tried ranging from a very small value such as 0.01 to a very large value such as 2.0. Further, the method of the invention imposes an artificial Schuler cycle on the inertial navigation position in the simulation. Since the error is known with and without the artificial Schuler cycle a priori, the accuracy and effect on TRN error states can be determined as a function of the various Q values. After numerous simulation runs the error models are created which represent a best blend of known error models for the multitude of cases. As a result the Schuler cycle can be accurately detected using the methods described above with the predetermined Q coefficients as illustrated in flowchart form in FIG. 4.

This invention has been described herein in considerable detail in order to comply with the Patent Statutes and to provide those skilled in the art with the information needed to apply the novel principles and to construct and use such specialized components as are required. However, it is understood that the invention can be carried out with specifically different equipment and devices, and that various modifications, both by equipment details and operating procedures, can be accomplished without departing from the scope of the invention itself.

What is claimed is:

1. A Schuler cycle phase detection method, wherein the Schuler cycle has at least one Schuler cycle precision point, the Schuler cycle phase detection method comprising the steps of:
   (a) determining a location of the at least one Schuler cycle precision point at at least one predetermined point in the Schuler cycle by relating the Schuler cycle to a predetermined cyclic measurement that varies with the Schuler cycle, and relating the Schuler cycle precision point to the predetermined cyclic measurement; and
   (b) estimating a current Schuler cycle phase from the at least one Schuler cycle precision point.

2. A Schuler cycle error reduction method for a terrain referenced navigation system, wherein the terrain referenced navigation system contains navigation errors according to the Schuler cycle and wherein the Schuler cycle has at least one Schuler cycle precision point, the Schuler cycle error reduction method comprising the steps of:
   (a) determining a location of the at least one Schuler cycle precision point at at least one predetermined point in the Schuler cycle by relating the Schuler cycle to a predetermined cyclic measurement that varies with the Schuler cycle, and relating the Schuler cycle precision point to the predetermined cyclic measurement;
   (b) estimating a Schuler cycle phase from the at least one Schuler cycle precision point; and
   (c) compensating the terrain referenced navigation system for the navigation errors according to the Schuler cycle.

3. The Schuler cycle error reduction method for a terrain referenced navigation system of claim 2 further comprising the step of compensating the terrain referenced navigation system for a 24 hour error bias.

4. The Schuler cycle error reduction method for a terrain referenced navigation system of claim 2 further comprising the step of selecting a predetermined inertial system error model to match the Schuler cycle phase, wherein the predetermined inertial system error model is utilized in compensating the terrain referenced navigation system to correct for the navigation errors according to the Schuler cycle.

5. The Schuler cycle error reduction method for a terrain referenced navigation system of claim 4 wherein the predetermined inertial system error model provides a short memory.

6. The Schuler cycle error reduction method for a terrain referenced navigation system of claim 4 wherein the predetermined inertial system error model provides a long memory.

7. The Schuler cycle error reduction method for a terrain referenced navigation system of claim 4 wherein the predetermined inertial system error model comprises a vector Q whose value is set in the range of 0.7–3.0.

8. The Schuler cycle error reduction method for a terrain referenced navigation system of claim 4 wherein the predetermined inertial system error model comprises a vector Q whose value is set in the range of 0.001–0.015.

9. A Schuler cycle phase detection method for a Schuler cycle, wherein the method comprises the steps of:
   (a) determining a cyclic function having a cyclic phase, wherein the cyclic function phase relates to the Schuler cycle phase;
   (b) determining at least one point of the Schuler cycle that corresponds to at least one point of the cyclic function; and
   (c) determining the Schuler cycle phase from the cyclic function phase.

10. A Schuler cycle error reduction method for a terrain referenced navigation system wherein the terrain referenced navigation system contains navigation errors according to the Schuler cycle, wherein the Schuler cycle has at least one Schuler cycle precision point, the Schuler cycle error reduction method comprising the steps of:
   (a) determining a cyclic function having a cyclic phase, wherein the cyclic function phase relates to the Schuler cycle phase;
   (b) determining at least one point of the Schuler cycle that corresponds to at least one point of the cyclic function;
   (c) determining the Schuler cycle phase from the cyclic function phase; and
   (d) compensating the terrain referenced navigation system for the navigation errors according to the Schuler cycle.

11. The Schuler cycle error reduction method for a terrain referenced navigation system of claim 10 further comprising the step of compensating the terrain referenced navigation system for a 24 hour error bias.

12. The Schuler cycle error reduction method for a terrain referenced navigation system of claim 10 further comprising the step of selecting a predetermined inertial system error model to match the Schuler cycle phase, wherein the predetermined inertial system error model is utilized in compensating the terrain referenced navigation system to correct for the navigation errors according to the Schuler cycle.

13. The Schuler cycle error reduction method for a terrain referenced navigation system of claim 12 wherein the predetermined inertial system error model provides a short memory model.

14. The Schuler cycle error reduction method for a terrain referenced navigation system of claim 13 wherein the predetermined inertial system error model provides a long memory model.

15. The Schuler cycle error reduction method of claim 14 wherein system error models are chosen for a nominal value at the location of the aircraft and a first long memory model is taken in a direction perpendicular to the line of flight of the aircraft and a short memory model is taken in a direction perpendicular to the flight of the aircraft but opposite in direction from the first long memory model.

16. The Schuler cycle error reduction method for a terrain referenced navigation system of claim 12 wherein the predetermined inertial system error model comprises a vector Q whose value is set in the range of 0.7–3.0.

17. The Schuler cycle error reduction method for a terrain referenced navigation system of claim 12 wherein the predetermined inertial system error model comprises a vector Q whose value is set in the range of 0.001–0.015.

18. The Schuler cycle error reduction method of claim 10 wherein the step of determining the cyclic function comprises the steps of:
   (a) setting a terrain referenced navigation filter coefficient to a nominal model filter;
   (b) analyzing an existing predetermined terrain referenced navigation data base from a simulated terrain referenced navigation flight;
   (c) running a predetermined number of test cases on a flight path of a hypothetical aircraft running through the predetermined terrain referenced navigation data base;
   (d) storing flight profiles;
   (e) analyzing different Q values ranging from a very small predetermined value to a very large predetermined value;
   (f) imposing an artificial Schuler cycle on the flight path during each run;
   (g) determining the Schuler cycle error based on prior knowledge of the location of the Schuler cycle; and
   (h) determining values of Q for any predetermined rate of change based on known error models for a multitude of cases.

19. An analytical method performed on a computer for determining the value of a predetermined error model for a terrain reference navigation system comprising the steps of:
   (a) setting a terrain reference navigation filter coefficient to a nominal model filter;
   (b) analyzing an existing predetermined terrain reference navigation data base from a simulated terrain reference navigation flight;
   (c) running a predetermined number of test cases on a flight path of a hypothetical aircraft running through the predetermined terrain referenced navigation data base;
   (d) storing flight profiles;
   (e) analyzing different Q values ranging from a very small predetermined value to a very large predetermined value;
   (f) imposing an artificial Schuler cycle on the flight path during each run;
   (g) determining the Schuler cycle error based on prior knowledge of the location of the Schuler cycle; and
   (h) determining the values of Q for any predetermined rate of change based on the known error models for the multitude of cases.

20. The analytical method of claim 19 wherein the very small predetermined values of Q range from 0.001–0.015.

21. The analytical method of claim 19 wherein the very large predetermined values Q range from a value of 0.7–3.0.

22. The analytical method of claim 19 wherein the nominal model filter includes a Q value in the range of 0.2–0.6.

* * * * *